Figure 1:
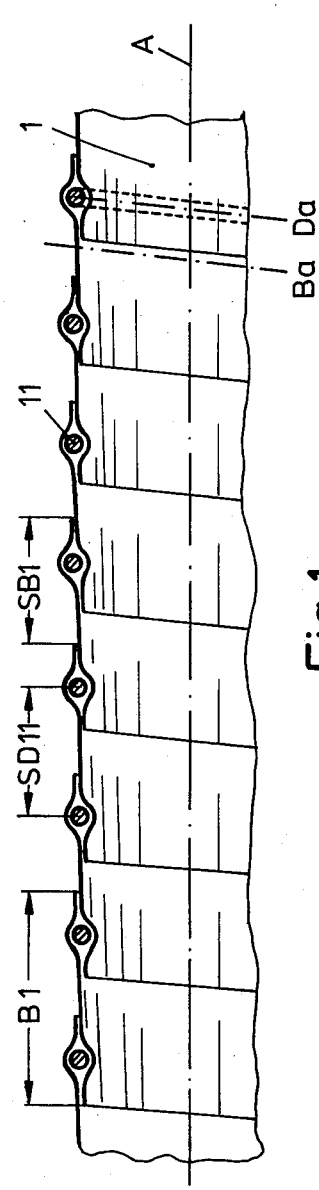

United States Patent [19]

Werner

[11] 4,452,280

[45] Jun. 5, 1984

[54] FLEXIBLE HOSE WOUND OF A WEB MATERIAL AND REINFORCED WITH WIRE WINDINGS

[75] Inventor: Friedrich Werner, Plettenberg, Fed. Rep. of Germany

[73] Assignee: Alcan Ohler GmbH, Plettenberg-Ohle, Fed. Rep. of Germany

[21] Appl. No.: 391,392

[22] Filed: Jun. 23, 1982

[30] Foreign Application Priority Data

Jun. 29, 1981 [DE] Fed. Rep. of Germany ....... 3125499

[51] Int. Cl.³ .............................................. F16L 11/00
[52] U.S. Cl. ................................. 138/131; 98/DIG. 7
[58] Field of Search ............... 138/122, 129, 134, 154, 138/173, 174, 123–128, 131, 139; 98/DIG. 7

[56] References Cited

U.S. PATENT DOCUMENTS

| | | | |
|---|---|---|---|
| 2,858,854 | 11/1958 | Daggett | 138/122 X |
| 3,300,571 | 1/1967 | Downey et al. | 138/131 X |
| 3,739,815 | 6/1973 | Rejeski | 138/122 |
| 4,203,476 | 5/1980 | Vitellaro | 138/129 X |

FOREIGN PATENT DOCUMENTS 2418990 10/1974 Fed. Rep. of Germany ...... 138/129

Primary Examiner—Stephen Marcus
Assistant Examiner—Mark Thronson
Attorney, Agent, or Firm—Finnegan, Henderson, Farabow, Garrett & Dunner

[57] ABSTRACT

The invention relates to a flexible hose formed of a wound web material and having its walls reinforced by wire windings, with the edges of successive web windings overlapping one another. In accordance with the invention, the longitudinal axes (Da) of the wires (13, 13′, 13″) and the longitudinal axis (ba) of the web material (3) extend at equal inclination with respect to the hose axis (A), and the reinforcement consists of at least two wire windings.

3 Claims, 5 Drawing Figures

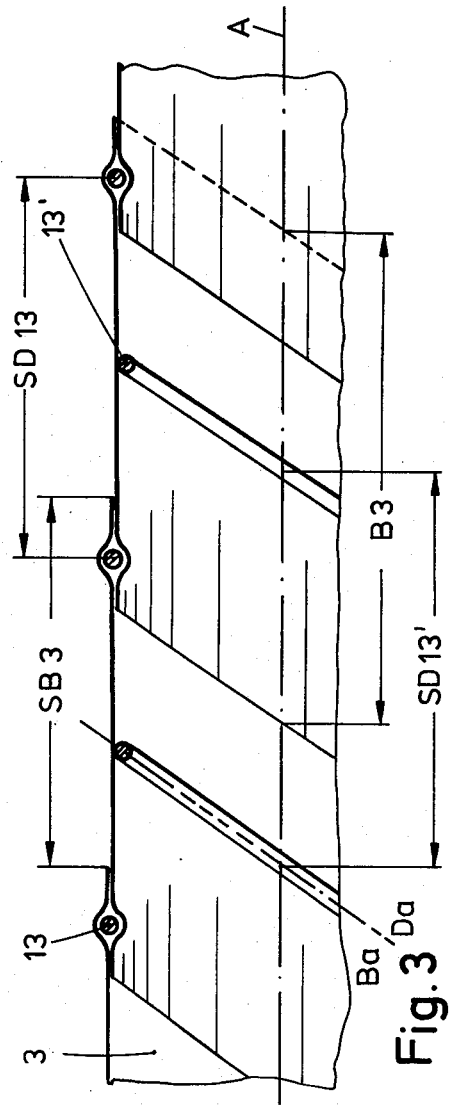
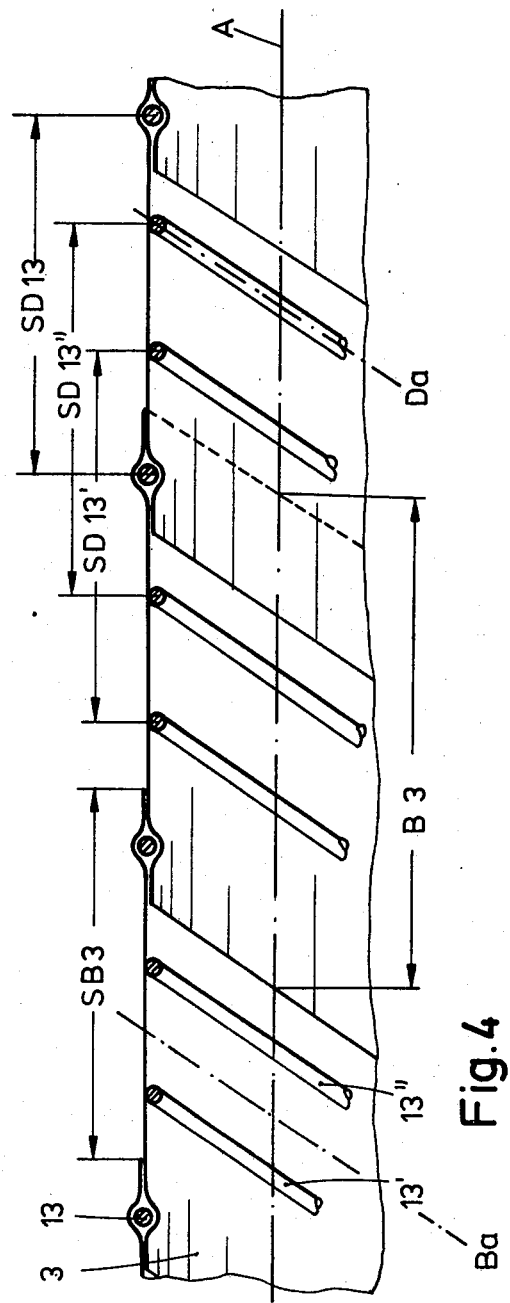

FLEXIBLE HOSE WOUND OF A WEB MATERIAL AND REINFORCED WITH WIRE WINDINGS

DESCRIPTION

This invention relates to a flexible hose wound of a constant-width, web material with overlapping edges of successive windings and reinforced with windings of a wire material affixed to the interior surface of the web material. The wire material comprises at least two juxtaposed wire coils having the same pitch as the wound web, at least one of the coils being spaced from the overlapped edges of successive web windings and engaged with only one web material winding.

Hoses of this type are frequently used for conveying gaseous products. They are thus for instance employed in the air conditioning art as air hoses or for the evacuation of dusts.

Hoses of the indicated type generally consist of a helical coil or winding of a sheet or web material or ribbon, and a helically wound wire coil. The material of the web or ribbon may be fabric, plastic-coated fabric, plastic sheet material, metal foil or compound foils, i.e. a fabric laminated with a plastic or metal foil. The web material or ribbon is wound in such a manner that the edges of successive windings overlap, the overlapping edges being subsequently interconnected by welding, adhering, sewing or equivalent techniques.

As the web material is usually too weak for imparting the requisite tensile and compressive strength to the finished hose, the hose wall formed of the wound web material is usually reinforced with a wire coil. The material of such wire coils may be metal wire with bare or corrosion-protected surfaces (zinc- or copper-clad wires), wire with a PVC coating or wires of aluminum or high density PVC.

There are generally two known types of foil hoses of this kind, which shall be discussed in the following with reference to FIGS. 1 and 2 of the drawings, showing part-sectional views of two embodiments of known foil hoses, the axis of which is designated by the letter A in FIGS. 1 and 2.

The hose shown in FIG. 1 is formed of a web or ribbon 1 having a width B1. Ribbon 1 may be wound on a cylindrical mandrel or on apparatus having radially adjustable guide rollers located within the hose under construction, with a constant pitch SB1 of the individual ribbon windings. The ribbon windings overlap one another, with a reinforcing wire 11 being embedded in the overlap during winding of the ribbon. The pitch SD 11 of the wire 11 is thus equal to that of the ribbon windings 1, so that the spacing between adjacent center lines Da drawn through the wire windings along the hose axis A is equal to the spacing between adjacent center lines Ba drawn through the ribbon windings.

This embodiment offers the advantage that the equal pitch of the ribbon and the wire permits the hose to be manufactured on a continuously operating machine. The production method lends itself to automatization, whereby the manufacturing costs are reduced.

A disadvantage of this embodiment lies in the fact that a rather wide overlap of adjacent ribbon windings is required for each wire winding. As, however, the permissible pitch width SD11 of the wire windings is limited by considerations regarding the stability of the finished hose, the consumption of ribbon material is rather excessive. The ribbon material is considerably more expensive as compared to the costs for the wire, i.e. the cost of the finished hose is mainly determined by the cost of the ribbon material.

Figure 2:
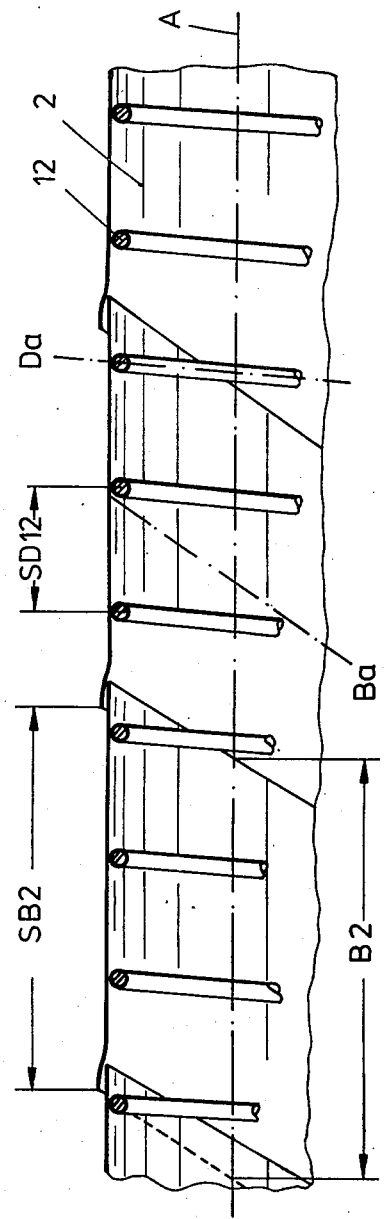

In the embodiment of FIG. 2 the hose is made of a ribbon 2 having a width B2 and wound with a constant pitch SB2. The ribbon windings overlap only slightly and are fixedly interconnected at the overlaps. The width B2 of ribbon 2 is considerably greater than the ribbon width B1 in the embodiment of FIG. 1. By reason of the stability of the finished hose, the coil formed of wire 12 has a pitch SD12 which is equal to the pitch SD11 in FIG. 1. The inclination of the wire axis Da with respect to the hose axis A may be equal to that of the ribbon axis Ba or different therefrom as shown in FIG. 2. The pitch of the ribbon windings along the hose axis is usually different from that of the wire windings, specifically, the pitch of the wire windings is smaller than that of the ribbon windings.

For manufacturing this type of hose, the wire coil is initially wound onto a cylindrical mandrel having the length of the hose to be made, whereafter the ribbon is wound onto the wire coil. The two separately wound layers are usually connected to one another by means of an adhesive.

This embodiment offers the advantage that the ribbon width B2 and thus the ribbon pitch SB2 may be selected independently of the wire pitch SD12. As the reinforcing wire is not to be embedded, the overlaps may be smaller, resulting in reduced cost for the ribbon material.

A disadvantage of this embodiment lies in the fact that the wire coil and the ribbon windings have to be separately wound onto a mandrel having the length of the hose to be made. This production method is time-consuming and does not readily lend itself to automation. Moreover, the hose connot be manufactured in a continuous manner but only in fixed-length sections.

It is thus an object of the invention to provide a hose formed of a wound web material and reinforced with wire windings, which can be manufactured at low production costs and low material costs while offering optimum flexibility and strength, particularly compression strength.

This object is attained by a hose which is wound of a constant-width web material with overlapping edges of successive windings and reinforced with windings of a wire material affixed to the interior surface of the web material. The wire material comprises at least two juxtaposed wire coils having the same pitch as the wound web, at least one of the coils being spaced from the overlapped edges of successive web windings are engaged with only one web material winding.

The structure according to the invention permits the pitch of the web material or ribbon as well as that of the wire windings to be selected such that the costs of the web material may be kept at a minimum without detracting from the stability of the hose. This stability is ensured by the additional wire windings. In the case of large widths of the web material it is of advantage to employ not only two wire coils or windings, but an even greater number. The number of the wire windings employed is obviously influenced by the intended use of the finished hose. If the hose is to be subjected to high mechanical loads, the number of wire windings employed will be greater.

The individual windings of the wire coils are advantageously disposed symmetrically with respect to the longitudinal axis of the associated ribbon winding, so that the wire windings achieve an optimum reinforcing effect and the hose is uniformly bendable.

In a particularly advantageous embodiment a wire winding is embedded in the overlap of each two adjacent ribbon edges.

Figure 5:
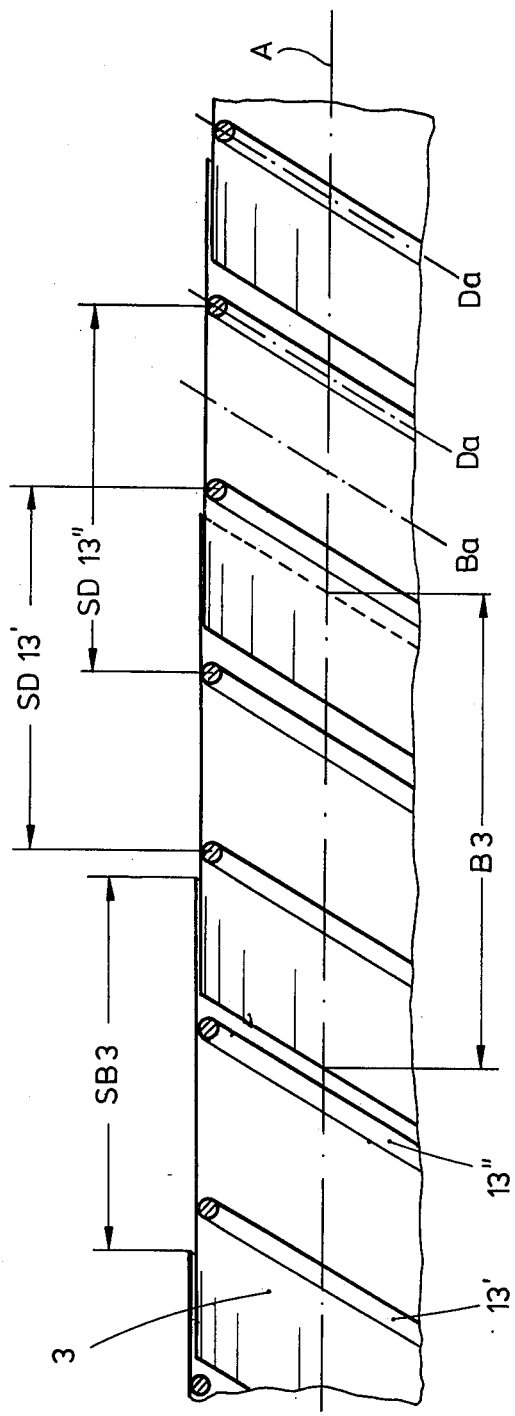

The subject matter of the invention shall now be descibed with reference to FIGS. 3, 4, and 5 of the drawings, showing part-sectional views of hose sections in accordance with three embodiments of the invention.

The hose shown in FIG. 3 is formed of a web 3 having a width B3 and wound to a helical coil having a pitch SB3. The center line Ba drawn through the web convolution coincides with the center line Da drawn through the convolution of a wire coil 13' and the center lines are inclined at a steeper angle with respect to a line perpendicular to the hose axes A as compared to the embodiment of FIG. 1. A further wire coil 13 is embedded in the overlap formed by successive web windings.

The pitch SD13 of the wire windings 13 equals the pitch SB3 of the web windings 3 and is selected so as to reduce the cost of the web material to a minimum without regard to the stability of the finished hose. In order to ensure sufficient stability of the hose in spite of a relatively large pitch of the wire windings 13, a further wire coil 13' is introduced, the windings of which extend between the wire windings 13 at the same pitch angle, so that SD13 equals SD13'.

FIG. 4 shows a variation of the embodiment of FIG. 3 employing three wire coils 13, 13', and 13". The pitch of the wire windings along the hose axis and thus the spacings between successive wire windings 13, 13' and 13" are equal to one another, as are the inclination of the center line Ba of the web winding 3 and that of the center line Da of the wire windings 13, 13' and 13" with respect to the hose axis A. As disclosed in the embodiment of FIG. 3, the wire windings are preferably disposed symmetrically with respect to the web center lines Ba.

The embodiment of FIG. 5 employs solely wire windings in contact with the interior web surface, i.e. there are no wire windings embedded in the overlapping web edges. The center lines Da of the two wire windings 13' and 13" extend parallel to the web center line Ba.

The wire windings 13' and 13" are adhesively attached to the interior surface of the web windings. In the case of a web material consisting of a PVC-coated fabric the wire windings may be of PVC-coated wire, permitting the wire windings to be attached to the hose wall by employ of an adhesive or by welding. Wires without a resin coating may be directly attached to the web surface as by the employ of a meltable adhesive.

The pitch angle of the wire windings influences the flexibility of the finished hose, the flexibility decreasing with increasing pitch angles. Relatively steep pitch angles were hitherto employed only in hoses having diameters below about 100 mm. The invention permits steeper pitch angles of for instance 20° to be employed also for hoses of larger diameters. Smaller pitch angles are employed in the case of hoses of very large diameter (above 400 mm), with the limit being about 2°.

It is particularly to be noted that the hose according to the invention is manufactured in a single operation. All wires and the web material are simultaneously fed to the winding apparatus. The wires are in the form of continuous strands and do not come in the form of individual sections.

I claim:

1. A flexible hose wound of a constantwidth web material with overlapping edges of successive windings and reinforced with windings of a wire material affixed to the interior surface of the web material, said wire material comprising at least two juxtaposed wire coils having the same pitch as the wound web, one of the coils being embedded between the overlapped edges of successive web windings and at least one of the coils being spaced from the overlapped edges of successive web windings and engaged with only one web material winding.

2. A hose according to claim 1, said windings of the wire coils being disposed symmetrically with respect to center lines drawn through the web windings.

3. A hose according to any of claims 1 or 2, characterized in that the pitch angle of the wire coils is 2° to 20°.

* * * * *